United States Patent
Washika et al.

(10) Patent No.: US 10,744,719 B2
(45) Date of Patent: Aug. 18, 2020

(54) METHOD FOR BONDING METAL AND RESIN AND METAL RESIN BONDED BODY

(71) Applicants: HIROTEC CORPORATION, Hiroshima-shi, Hiroshima (JP); OSAKA UNIVERSITY, Suita-shi, Osaka (JP)

(72) Inventors: Kiminori Washika, Hiroshima (JP); Yousuke Kawahito, Suita (JP)

(73) Assignees: HIROTEC CORPORATION, Hiroshima-shi (JP); OSAKA UNIVERSITY, Osaka (JP)

( * ) Notice: Subject to any disclaimer, the term of this patent is extended or adjusted under 35 U.S.C. 154(b) by 316 days.

(21) Appl. No.: 15/854,051

(22) Filed: Dec. 26, 2017

(65) Prior Publication Data
US 2018/0178455 A1 Jun. 28, 2018

(30) Foreign Application Priority Data
Dec. 28, 2016 (JP) ................. 2016-254742

(51) Int. Cl.
*B29C 65/16* (2006.01)
*B32B 15/08* (2006.01)
(Continued)

(52) U.S. Cl.
CPC .......... *B29C 65/1635* (2013.01); *B29C 65/16* (2013.01); *B29C 65/44* (2013.01);
(Continued)

(58) Field of Classification Search
CPC ..... B29C 65/1635; B29C 65/16; B29C 65/44; B29C 65/8215; B29C 66/026;
(Continued)

(56) References Cited

U.S. PATENT DOCUMENTS 8,168,031 B2 * 5/2012 Katayama ............... B29C 65/44
156/272.8
2011/0305893 A1* 12/2011 Chang ............... B29C 45/14311
428/322.7
(Continued)

FOREIGN PATENT DOCUMENTS

CN 102712136 A * 10/2012 ....... B29C 66/30325
JP 2008-213156 A 9/2008
(Continued)

OTHER PUBLICATIONS

CN 102712136 A , English machine translation, printed Jan. 31, 2020 (Year: 2020).*

*Primary Examiner* — Christine J Skubinna
(74) *Attorney, Agent, or Firm* — Westerman, Hattori, Daniels & Adrian, LLP

(57) ABSTRACT

A direct bonding method of metal and resin comprises a first step where the metal material is subjected to electrolytic treatment by using a carboxylic acid to form a new surface, which is then coated with the carboxylic acid to obtain a carboxylic acid-coated metal material; a second step where the resin material and the carboxylic acid-coated metal material are laminated to form an interface to be bonded; a third step where the interface is heated to Tg of the resin material or higher by heating means to remove water from the interface, the decomposition of the resin material generates a carboxyl group, and the new surface is exposed on the surface of the carboxylic acid-coated metal material by removal of the carboxylic acid; and a fourth step where the interface is cooled below the Tg to form a bonded part by bonding the carboxyl group and the new surface.

22 Claims, 7 Drawing Sheets

(51) Int. Cl.
*B29C 65/00* (2006.01)
*B29C 65/82* (2006.01)
*B29C 65/44* (2006.01)

(52) U.S. Cl.
CPC ........ *B29C 65/8215* (2013.01); *B29C 66/026* (2013.01); *B29C 66/028* (2013.01); *B29C 66/1122* (2013.01); *B29C 66/12441* (2013.01); *B29C 66/135* (2013.01); *B29C 66/43* (2013.01); *B29C 66/7212* (2013.01); *B29C 66/742* (2013.01); *B32B 15/08* (2013.01); *B29C 66/71* (2013.01)

(58) Field of Classification Search
CPC ............... B29C 66/028; B29C 66/1122; B29C 66/12441; B29C 66/135; B29C 66/43; B29C 66/7212; B29C 66/742; B23B 15/08
USPC ...................................................... 219/121.6
See application file for complete search history.

(56) References Cited

U.S. PATENT DOCUMENTS

2013/0192751 A1\* 8/2013 Arai .................... B29C 66/1122
156/272.6
2015/0064409 A1\* 3/2015 Takeuchi ................ B32B 15/08
428/164
2016/0082687 A1\* 3/2016 Inami ..................... B32B 15/14
428/124

FOREIGN PATENT DOCUMENTS

JP 2016-16429 A 2/2016
WO 2014/034340 A1 3/2014

\* cited by examiner

METHOD FOR BONDING METAL AND RESIN AND METAL RESIN BONDED BODY

TECHNICAL FIELD

The present invention relates to a bonding method of a metal material and a resin material and a metal resin bonded body where a metal material and a resin material are bonded, and more specifically, a method for bonding firmly a metal material and a resin material directly without using an adhesive, rivet and the like, and a metal resin bonded body having a firmly bonded part.

PRIOR ARTS

Conventionally, for bonding a metal material and a resin material, there have been generally used an adhesive or rivet fixing. In case that the adhesive is used, the bonding is achieved by physical adsorption or chemical adsorption. In case that the rivet fixing is employed, the bonding is achieved by physical fixing of the rivet.

However, in case that the adhesive is used, there are problems that, since the adhesive is easy to be wetted and spread, it is inconvenient to use for a precise bonding where the bonding region is restricted, and in addition thereto, and that the bonding strength varies largely depending to the condition (surface roughness, etc.) of the surface to be bonded. Further, there are problems that productivity is limited by a period of time for curing the adhesive, and maintenance and controlling of the state of the adhesive are difficult.

In case that the rivet fixing is employed, the part to be applied is limited, since the part becomes large and heavy due to the size and weight of a part to be fixed, and in addition thereto, freedom of design is also lowered.

In contrast, recently, there has been studied a technique that a metal material and a resin a material are bonded directly by using a laser. For example, Patent Document 1 (JP2008-213156 A) discloses a metal resin bonding method where, in a method for bonding a metal material and a resin material by heating the resin material of a bonded part to a temperature forming air bubbles with the laser beam source in the manner that the metal material and the resin material are contact to each other, as the laser beam source, a resin melting laser beam source for heating the resin material to a resin melting temperature and a resin decomposing laser beam source for heating the resin material to the resin decomposing temperature of the resin material are used.

According to the metal resin bonding method described in Patent Document 1, in the method for bonding the metal material and the resin material by heating the resin material of a bonded part to a temperature forming air bubbles with the laser beam source since as the laser beam source, the resin melting laser beam source and the resin decomposing laser beam source are used, the controlling of the heating place and the heating temperature of the resin are extremely easy and efficiently, which results in contributing the uniform formation of a bonded part having a high strength.

Further, Patent Document 2 (JP2016-016429 A) discloses a bonding method for performing laser bonding between a metal member and a resin member, which is a bonding method between the metal member and the resin member comprising: a process of preparing the metal member which has a rugged part and includes a first surface to be bonded, allowing a hydroxyl group or reactive functional group to be introduced thereto; a process of preparing the resin member provided with a second surface to be bonded, allowing a functional group having the reactivity with the hydroxyl group or the reactive functional group to be introduced; a process of bringing the first surface to be bonded of the metal member into contact with the second surface to be bonded of the resin member; and a process of irradiating the first surface to be bonded of the metal member with a laser beam to heat the first surface to be bonded, and soften or melt the second surface to be bonded of the resin member by the generated heat, engaging the second surface to be bonded of the resin member with the rugged part of the metal member, at the same time, reacting the hydroxyl group or the reactive functional group with the functional group and bonding the metal material with the resin member.

According to the metal resin bonding method described in Patent Document 2, the metal material and the resin member can be firmly and directly bonded by chemical bonding due to the functional group introduced to each member, in addition to mechanical bonding where the rugged part of the metal material is utilized.

Further, Patent Document 3 (WO2014/034340) proposes a metal member for producing a metal/resin composite body, which is used when a metal/resin composite body is produced by bringing a resin member, which is formed of a laser light-transmitting thermoplastic resin, into contact with the surface of a metal member; melting a portion of the resin member, the portion being in contact with the metal member, by irradiating the resin member with laser light from the resin member side under pressure, thereby bonding the metal member and the resin member with each other, wherein the metal member has a corrugated surface that has an overhang ratio of 5 to 40%, and a light absorption coating film having a light absorptance of 60% or more (at a wavelength of 800 nm) is provided on the corrugated surface.

According to the metal member for producing the metal/resin composite body of Patent Document 3, since the surface roughness of the corrugated surface of the metal base is controlled, the melted resin can be reserved sufficiently on the concaved surface when solidifying, and thus it is possible to solve the low bonding strength and airtightness at the bonding interface, which results in producing the metal/resin composite body having excellent bonding strength and airtightness.

PRIOR TECHNICAL DOCUMENTS

Patent Document

[Patent Document 1] JP2008-213156 A
[Patent Document 2] JP2016-016429 A
[Patent Document 3] WO2014/034340

SUMMARY OF THE INVENTION

Problem to be Solved by the Invention

Here, though the bonded parts obtained by the metal resin bonding method described in Patent Documents 1 to 3 have relatively good joint property, in case that the bonded part is applied to structural members where better reliability is needed, higher joint property is required thereto.

Further, in the bonding method of Patent Document 2, in addition to that the metal member should have the rugged part, the method can be applied only to the case where the metal member having a hydroxyl group or reactive functional group to be introduced thereto and the resin member having a functional group having the reactivity with the hydroxyl group or the reactive functional group to be introduced. Further, in the metal/resin composite body of Patent Document 3, since it is necessary that the metal member has a corrugated surface that has an overhang ratio of 5 to 40%, and a light absorption coating film having a light absorptance of 60% or more (at a wavelength of 800 nm) is provided on the corrugated surface, the combination to be able to be bonded is restricted, and further the bonding process is complicated.

Furthermore, according to the bonding methods of Patent Documents 1 to 3, the part to be bonded is basically restricted to a resin which is transparent against the laser beam, and thus, for example, a colored resin such as CFRP cannot be bonded.

Considering the aforementioned problems of the conventional techniques, the object of the present invention is to provide a simple method for directly bonding various metal materials and resin materials, and a metal resin bonded body having a strongly bonded part, and more specifically, to provide a bonding method for obtaining a metal resin bonded body having a high bonding strength which cannot be realized by the conventional bonding methods.

Means to Solve the Problem

In order to achieve the aforementioned object, the present inventors have studied various methods for bonding a metal material and a resin material intensively, and have found that it is effective that a new surface of the metal material is chemically reacted with a carboxyl group derived from the resin material by thermal decomposition, and then the present invention has been completed.

Namely, the present invention can provide a bonding method of a metal material and a resin material wherein the metal material and the resin material are bonded directly, which comprises:

a first step where the metal material is subjected to electrolytic treatment by using a carboxylic acid having reducibility to form a new surface on the metal material, and the new surface is coated with the carboxylic acid to obtain a carboxylic acid-coated metal material;

a second step where the resin material and the carboxylic acid-coated metal material are laminated to form an interface to be bonded;

a third step where the interface to be bonded is heated to a glass transition temperature of the resin material or higher by a heating means to remove water from the interface to be bonded, and by the decomposition of the resin material, a carboxyl group is generated, and at the same time, the new surface is exposed on the surface of the carboxylic acid-coated metal material by removal of the carboxylic acid; and a fourth step where the interface to be bonded is cooled to a temperature lower than the glass transition temperature to form a bonded part by bonding the carboxyl group and the new surface.

The metal resin bonding method of the present invention can give a strong bonding by chemically reacting the new surface of the metal material with the carboxyl group derived from the resin material by thermal decomposition, and is entirely different in bonding principal from the method where the metal material and the resin material are bonded mechanically by utilizing the rugged part of the surface of the metal material, and from the method where the functional groups having reactivity are reacted with each other to obtain the bonding. In the present description, the "new surface" means the state where the surface of the metal material is activated by removing the outermost surface, and for example, includes the state where an oxide film is removed to expose the metal material, and the state where the outermost surface of the oxide film is removed and cleaned.

According to the metal resin bonding method of the present invention, since the new surface of the metal material and the carboxyl group derived from the resin material are chemically reacted, in comparison with the case where the functional groups having reactivity are reacted with each other, the number of the connecting sites can be drastically increased to be able to form the extremely strong metal resin bonded part.

In order to easily achieve the chemical reaction of the new surface of the metal material and the carboxyl group derived from the resin material, the metal resin bonding method of the present invention includes the first step where the metal material is subjected to electrolytic treatment by using a carboxylic acid having reducibility to form a new surface on the metal material, and the new surface is coated with the carboxylic acid to obtain a carboxylic acid-coated metal material; the second step where the resin material and the carboxylic acid-coated metal material are laminated to form an interface to be bonded; the third step where the interface to be bonded is heated to a glass transition temperature of the resin material or higher by a heating means to remove water from the interface to be bonded, and by the decomposition of the resin material, a carboxyl group is generated, and at the same time, the new surface is exposed on the surface of the carboxylic acid-coated metal material by removal of the carboxylic acid; and the fourth step where the interface to be bonded is cooled to a temperature lower than the glass transition temperature to form a bonded part by bonding the carboxyl group and the new surface.

In the first step of the metal resin bonding method of the present invention, the surface of the metal material is reduced to form the new surface by properly subjecting the metal material to electrolytic treatment by using a carboxylic acid having reducibility. At the same time, the new surface is coated with the carboxylic acid to give the carboxylic acid-coated metal material. Namely, with respect to the carboxylic acid-coated metal material, the new surface is protected by being coated with the carboxylic acid, and is in the state where the progress of oxidation and corrosion, etc. is inhibited.

Next, according to the metal resin bonding method of the present invention, the connecting sites which are necessary to bond are prepared by, in the second step, laminating the resin material and the carboxylic acid-coated metal material to form an interface to be bonded, and in the third step, heating the interface to be bonded to a glass transition temperature of the resin material or higher by a heating means to remove water from the interface to be bonded, and generating a carboxyl group by the decomposition of the resin material, and at the same time, exposing the new surface on the surface of the carboxylic acid-coated metal material by removal of the carboxylic acid.

In the second step, the wording of "the resin material and the carboxylic acid-coated metal material are laminated to form an interface to be bonded" includes a manner that the plane surfaces of the resin material and the carboxylic acid-coated metal material are in contact with each other (usual laminate bonding), and a manner that the end face of the resin material is in contact with the plane surface of the carboxylic acid-coated metal material (T-type bonding), and the like.

Here, since hydroxyl group cannot contribute directly to the bonding process of the metal resin bonding method of the present invention, and there is a case where the hydroxyl group inhibits the coating of the new surface with the carboxylic acid and the connection between the new surface and the carboxyl group, water is removed by elevating the temperature of the interface to be bonded. Further, when removing water from the interface to be bonded, it is possible to inhibit the lowering of the joint property under a low temperature circumstance effectively.

Next, in the fourth step of the metal resin bonding method of the present invention, the interface to be bonded is cooled to a temperature lower than the glass transition temperature to form a bonded part by bonding the carboxyl group and the new surface. Namely, according to the metal resin bonding method of the present invention, the bonding is not completed in the temperature rising process, but is completed by the re-stabilization of the new surface in the cooling process.

In the metal resin bonding method of the present invention, the carboxylic acid is preferably oxalic acid or formic acid. When subjecting the metal material to electrolytic treatment by using oxalic acid or formic acid, in the aforementioned bonding mechanism, the formation of the new surface, the coating on and the removal from the new surface can proceed smoothly, and then the extremely strong bonded part can be formed smoothly. The carboxylic acid may be used alone, or may be used in the mixed manner. Further, a mixed solution containing the carboxylic acid may be used. Other than oxalic acid and formic acid, the mixed solution may contain phosphoric acid, ammonium dihydrogen citrate, and the like.

Further, in the metal resin bonding method of the present invention, the laser irradiation is preferably employed as the heating means. The heating means is not particularly limited as far as the effect of the present invention is not impaired, various known heating means can be employed, and when employing the laser irradiation, it is possible to rise the temperature of the interface to be bonded simply and properly.

Further, in the metal resin bonding method of the present invention, it is preferable that the laser is irradiated from the metal material side. When irradiating the laser from the resin material side, since laser beam transparency is required to the resin material, for example, a colored resin such as a carbon fiber reinforced plastics (CFRP) cannot be used as the material to be bonded. To the contrary, when irradiating the laser from the metal material side, it is possible to rise the temperature of the interface to be bonded to the glass transition temperature of the resin material or higher, and thus any kind of the material to be bonded can be used. Further, when irradiating from the metal material side, it is possible to provide a space at the resin material side, and the pressurizing process (specifically explained in the following) from the surface of the resin side can be easily carried out.

Furthermore, in the metal resin bonding method of the present invention, it is preferable that the bonded part is pressed just after the fourth step. Though the bonded part produced by the metal resin bonding method of the present invention has a sufficiently high strength, it is possible to lower unevenness of quality by adding the pressurizing step. When employing the pressurizing step, for example, since the bubbles which are introduced into the resin during the heating step can be moved to the outside of the bonded part, a higher reliable bonded part can be obtained. Furthermore, since the softened resin material spreads beyond the heated region of the metal material by the pressurizing process, it is possible to extend the interface to be bonded between the metal material and the resin material.

When a slight amount of the molten resin material exists at the interface to be bonded, since the molten resin material extends to the interface to be bonded by the pressurizing process, a portion where the temperature is lower than the melting temperature can also be bonded. The pressure is preferably 1.40 to 1.85 MPa, more preferably 1.70 to 1.85 MPa. When the pressure is 0.25 MPa or higher, the bubbles can be reduced (moved) effectively, and when 1.85 MPa or lower, it is possible to inhibit a thickness of the resin material from being too thin at the bonded part.

In addition, the present invention can provide a metal resin bonded body which is a laminated bonded body of a metal material and a resin material, wherein the resin material and the metal material are bonded directly, and the metal material is elongated in a tensile test of the bonded part.

The metal resin bonded body of the present invention can be produced by the metal resin bonding method of the present invention, and the metal material and the resin material are bonded directly without using any adhesive and rivet. Further, the "tensile test" in the present invention is based on the international standard ISO19095 of Resin-Metal Bonding Property Evaluation Test. Though, according to the usual standard test, it is difficult to quantitatively evaluate the bonded part because a resin part which is weaker than the bonded part is fractured firstly, since, according to ISO19095, the resin part can be prevented from the fracture by optimizing the test piece and using auxiliary jig, it is possible to measure the strength of the bonded part.

When the resin material and the metal material are bonded directly according to the conventional bonding methods, since the strength of the interface to be bonded is not sufficient, the metal material would not be elongated in the tensile test of the bonded part. To the contrary, the interface to be bonded which is obtained according to the metal resin bonding method has a high strength, the bonded part has a bonding strength as high as the metal material is elongate in the tensile test.

Further, in the metal resin bonded body of the present invention, it is preferable that the metal material is fractured in the tensile test of the bonded part. Since the interface to be bonded of the metal resin bonded body of the present invention has an extremely high strength, depending to the combination of the metal material and the resin material, the bonded part has a remarkable bonding strength as high as the metal material is fractured after the elongation.

Further, in the metal resin bonded body of the present invention, it is preferable that the metal material is a steel. When using the steel as the metal material, it is possible to realize to provide a cheap and strong metal resin bonded body. According to the metal resin bonded body of the present invention, even when the metal material is the steel, the interface to be bonded has a bonding strength as strong as the steel is elongate in the tensile test, and in a certain case, the bonded par has such a high reliability that the steel is fractured after the elongation.

Furthermore, in the metal resin bonded body of the present invention, it is preferable that the resin material has a Hemming processed part where the metal material is folded and fixed, and the resin material and the metal material are bonded directly at the Hemming processed part.

Though the bonded part where the metal material and the resin material are directly bonded shows a high strength with respect to a shearing stress, the bonded part is relatively easy to be fractured when a stress is applied in the peeling direction. To the contrary, when the bonded part of the metal material and the resin material is made in the form of the Hemming processed part where the resin material is fixed by folding the metal material, the stress applied in the peeling direction to the bonded part can be effectively inhibited. As a result, under the practical circumstance of the metal resin bonded body, the shearing stress is mainly applied to the bonded part, and the metal resin bonded body can be endowed with high reliability.

Effects of the Invention

According to the metal resin bonding method and the metal resin bonded body of the present invention, it is possible to provide a simple method for directly bonding various metal materials and resin materials, and a metal resin bonded body having a strongly bonded part, and more specifically, to provide a bonding method for obtaining a metal resin bonded body having a high bonding strength which cannot be realized by the conventional bonding methods.

MODE FOR CARRYING OUT THE INVENTION

In the following, by referring the drawings, typical embodiments of the metal resin bonding method and the resin metal bonded body of the present invention are explained, but the present invention is not limited thereto. In the following explanation, the same symbol is given to the same or corresponding parts, and there is a case where overlapping explanation is omitted. In addition, since these drawings are presented to explain the concept of the present invention, there are cases where size and ratio of the structural elements are different from the real case.

(1) Metal Resin Bonding Method

Figure 1:
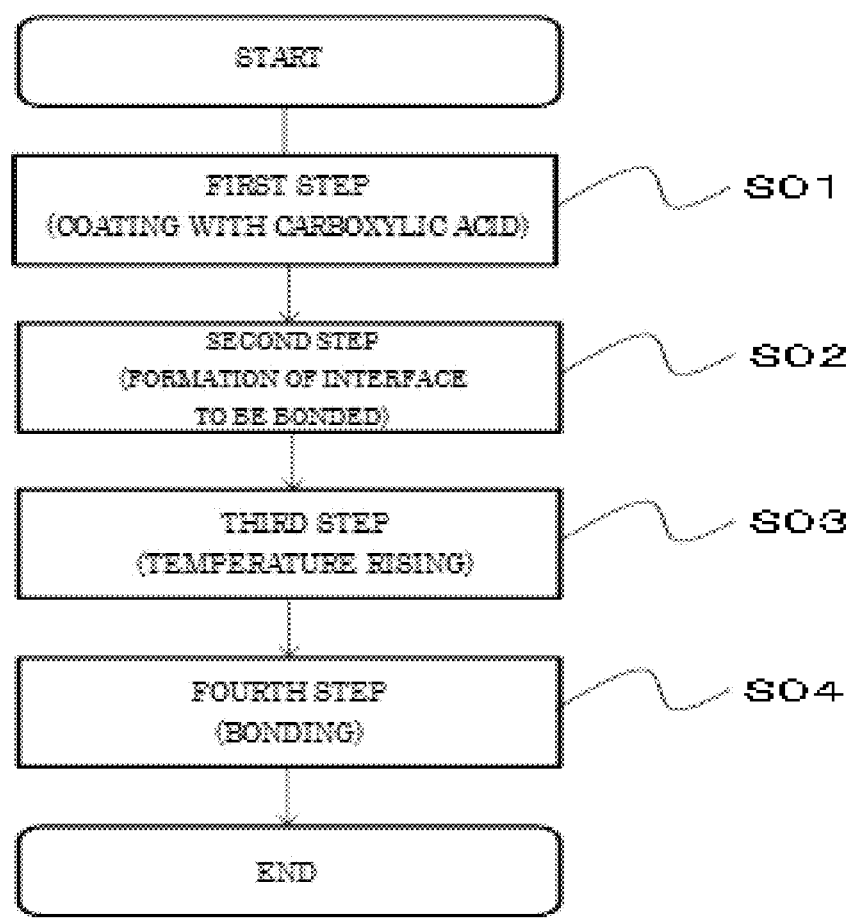
FIG. 1 is a process step chart showing the metal resin bonding method of the present invention.

FIG. 1 shows a process step chart of the metal resin bonding method of the present invention. The metal resin bonding method of the present invention is a method where the metal material and the resin material are bonded directly, which comprises:

the first step (SO1) where the metal material is subjected to electrolytic treatment by using a carboxylic acid having reducibility to form a new surface on the metal material, and the new surface is coated with the carboxylic acid to obtain a carboxylic acid-coated metal material; the second step (SO2) where the resin material and the carboxylic acid-coated metal material are laminated to form an interface to be bonded; the third step (SO3) where the interface to be bonded is heated to a glass transition temperature of the resin material or higher by a heating means to remove water from the interface to be bonded, and by the decomposition of the resin material, a carboxyl group is generated, and at the same time, the new surface is exposed on the surface of the carboxylic acid-coated metal material by removal of the carboxylic acid; and the fourth step (SO4) where the interface to be bonded is cooled to a temperature lower than the glass transition temperature to form a bonded part by bonding the carboxyl group and the new surface. In the following, each process step is explained in detail.

(1-1) First Step (SO1: Step for Coating with Carboxylic Acid)

The first step (SO1) is a step where the metal material is subjected to electrolytic treatment by using the carboxylic acid having reducibility to form the new surface on the metal material, and the new surface is coated with the carboxylic acid to obtain a carboxylic acid-coated metal material.

This step is a step where the metal material is subjected to electrolytic treatment by using the carboxylic acid to form the new surface on the metal material, and by coating with the carboxylic acid, the new surface which contributes directly to the bonding is protected, which results in obtaining the carboxylic acid-coated metal material having the new surface which is utilizable in the fourth step (SO4).

The carboxylic acid having reducibility used in the first step (SO1) is preferably oxalic acid or formic acid. When subjecting the metal material to electrolytic treatment by using oxalic acid or formic acid, the formation of the new surface, the coating on and the removal from the new surface can proceed smoothly, and then the extremely strong bonded part can be formed smoothly. The carboxylic acid may be used alone, or may be used in the mixed manner. Here, when mixing oxalic acid and formic acid, a mixing ratio of oxalic acid to formic acid is preferably 1:2. When using a mixed electrolytic solution of oxalic acid and formic acid to the steel, iron oxalate has a small solubility (0.026% by mass to hot water), the iron oxalate is precipitated on the surface of the s steel, and acts as a protective film which inhibits the dissolution of the steel. To the contrary, since the surface of the steel can be dissolved as iron formate, good new surface can be formed by inhibiting the excess dissolution of the surface. Further, a mixed solution containing the carboxylic acid may be used. Other than oxalic acid and formic acid, the mixed solution may contain phosphoric acid, ammonium dihydrogen citrate, and the like.

The technique where aluminum is subjected to electrolytic treatment by using oxalic acid is generally known as an alumite treatment (anodizing treatment). The alumite treatment is to form an oxide film on the surface of the aluminum material, but the first step (SO1) is to form the new surface and to protect the new surface, and thus the conditions of the electrolytic treatment are remarkably different from each other. For example, in case of the alumite treatment by using oxalic acid, the electrolytic treatment is carried out in a oxalic acid concentration of 2% to 3% for 20 minutes to 30 minutes, but in case of the first step (SO1) by using oxalic acid, it is preferable to carry out in an oxalic acid concentration of 10% for a shorter treating time.

The metal material is not particularly limited as far as the effect of the present invention is not impaired, various known metal materials may be used, and examples include various steels, zinc plated steels, aluminum alloys, magnesium alloys, and the like.

(1-2) Second Step (SO2: Step for Forming Interface to be Bonded)

The second step (SO2) is a step where the resin material and the carboxylic acid-coated metal material obtained in the first step (SO1) are laminated to form an interface to be bonded.

Here, the carboxylic acid-coated metal material and the resin material may be in the state that the plane surfaces thereof are in contact with each other to be a usual manner, and the state that the end face of the resin material is in contact with the plane surface of the carboxylic acid-coated metal material, so-called as T-type joint.

The resin material is not particularly limited as far as the effect of the present invention is not impaired, various known metal materials may be used, and examples include polyamide (PA), polycarbonate (PC), PET (polyethylene terephthalate), various carbon fiber reinforced plastics (CFRP), glass fiber reinforced plastics (GFRP), and the like.

(1-3) Third Step (SO3: Step for Rising Temperature)

The third step (SO3) is a step where the interface to be bonded which is formed in the second step (SO2) is heated to a glass transition temperature of the resin material or higher by a heating means to remove water from the interface to be bonded, and by the decomposition of the resin material, a carboxyl group is generated, and at the same time, the new surface is exposed on the surface of the carboxylic acid-coated metal material by removal of the carboxylic acid.

The heating means is not particularly limited as far as the effect of the present invention is not impaired, various known heating means can be employed. More specifically, it is sufficient that the heating means can rise the temperature of the interface to be bonded to the glass transition temperature of the resin material or higher, and for example, there may be employed laser irradiation, arc heating, resistance heating, electrical induction heating, and the like. Here, the laser irradiation is preferably employed from the viewpoint of easiness of the heating, or the like.

Further, when the laser irradiation is employed as the heating means, the laser is preferably irradiated from the metal material side. When irradiating the laser from the resin material side, since laser beam transparency is required to the resin material, for example, a colored resin such as a carbon fiber reinforced plastics (CFRP) cannot be used as the material to be bonded. To the contrary, when irradiating the laser from the metal material side, it is possible to rise the temperature of the interface to be bonded to the glass transition temperature of the resin material or higher, and thus any kind of the material to be bonded can be used. Further, when irradiating from the metal material side, it is possible to provide a space at the resin material side, and the pressurizing process from the surface of the resin side can be easily carried out.

Further, by rising the temperature of the interface to be bonded to the glass transition temperature of the resin material or higher, water can be removed from the interface to be bonded. For example, like an interface to be bonded by using an adhesive, in case that water exists on the interface to be bonded, when the practical circumstance is below the freezing point, the joint property goes down remarkably. To the contrary, according to the metal resin bonding method of the present invention, since water can be removed from the interface to be bonded, it is possible to inhibit the lowering of the joint property effectively.

Further, by the rising of the temperature, the resin material is decomposed to yield carboxyl group derived from the resin material. On the other hand, with respect to the carboxylic acid-coated metal material, the carboxylic acid which covers (protects) the new surface is removed so that an active new surface is exposed.

When the degree of the temperature elevation is small, the exposure of the new surface and yield of the carboxyl group are not enough so that the strength of the interface to be bonded cannot be increased sufficiently, and when the degree of the temperature elevation is too large, there are problems that the resin is peeled off from the interface to be bonded and that the strength of the resin is lowered due to the heating. Therefore, for example, the laser irradiation is employed as the heating means, it is preferable that the proper heating conditions are selected by controlling process parameters such as power of laser, scanning speed, and focal distance.

(1-4) Fourth Step (SO4: Step for Bonding)

The fourth step (SO4) is a step where the interface to be bonded is cooled to a temperature lower than the glass transition temperature to form a bonded part by bonding the carboxyl group and the new surface. Namely, in the metal resin bonding method of the present invention, the bonding is practically carried out in the fourth step (SO4), and the first step (SO1) to the third step (SO3) are the preparation steps of the fourth step (SO4).

In the fourth step (SO4), by chemically reacting the new surface of the metal material with the carboxyl group derived from the resin material, extremely strong direct bonding between the metal material and the rein material can be obtained. In comparison with the conventional case where the functional groups having reactivity are reacted with each other, according to the metal resin bonding method, since the number of the connecting sites can be extremely increased, and the bonding strength of the bonding can be drastically improved.

It is preferable that the bonded part is pressed just after the fourth step (SO4). The pressurizing just after the formation of the bonded part may be carried out by simply applying pressure from the both of the metal material side and the resin material side. Though the bonded part produced by the metal resin bonding method of the present invention has a sufficiently high strength, it is possible to lower unevenness of quality by adding the pressurizing step. When employing the pressurizing step, for example, since the bubbles which are introduced into the resin during the heating step can be moved to the outside of the bonded part, a higher reliable bonded part can be obtained. Furthermore, since the softened resin material spreads beyond the heated region of the metal material by the pressurizing process, it is possible to extend the interface to be bonded between the metal material and the resin material.

When a slight amount of the molten resin material exists at the interface to be bonded, since the molten resin material extends to the interface to be bonded by the pressurizing process, a portion where the temperature is lower than the melting temperature can also be bonded. The pressure is preferably 1.40 to 1.85 MPa, more preferably 1.70 to 1.85 MPa. When the pressure is 0.25 MPa or higher, the bubbles can be reduced (moved) effectively, and when 1.85 MPa or lower, it is possible to inhibit a thickness of the resin material from being too thin at the bonded part.

(2) Metal Resin Bonded Body

Figure 2:
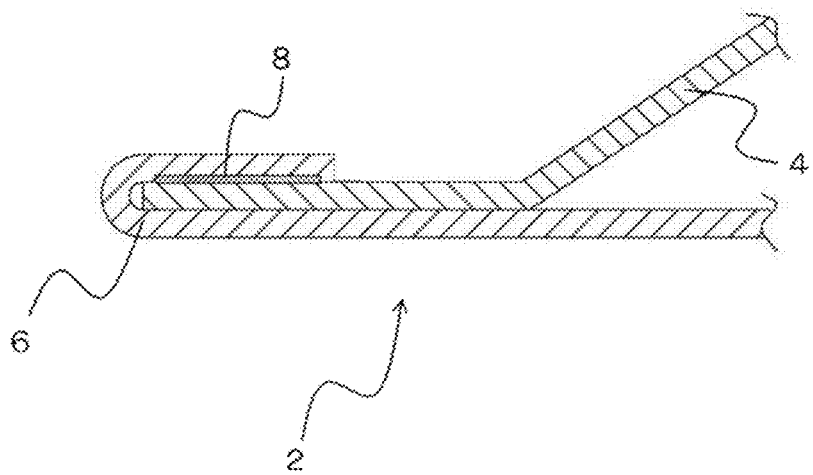
FIG. 2 is a schematic sectional view of one embodiment of the metal resin bonded body of the present invention.

FIG. 2 is one embodiment showing a schematic sectional view of the metal resin bonded body of the present invention. The shape of the metal resin bonded body 2 is not particularly limited as far as the effect of the present invention is not impaired, various known heating means can be employed, and FIG. 2 shows a bonded body having a Hemming processed part which is suitable to use the use of the metal resin bonded body of the present invention. The Hemming processed part has a Hemming processed part where the resin material 4 is fixed by folding the metal material 6, and the resin material 4 and the metal material 6 are bonded directly at the bonded part 8 in the Hemming processed part.

The metal resin bonded body 2 is a laminated bonded member of the resin material 4 and the metal material 6, and is a metal resin bonded body where the resin material 4 and the metal material 6 are bonded directly, and the metal material 6 is elongated when a tensile test piece including the bonded part 8 is subjected to the tensile test. The metal resin bonded body 2 is produced by directly bonding the resin material 4 and the metal material 6, there is no adhesive and rivet in the bonded part 8. The metal resin bonded body 2 can be produced preferably according to the metal resin bonding method of the present invention.

Further, as mentioned above, the "tensile test" in the present invention is based on the international standard ISO19095 of Resin-Metal Bonding Property Evaluation Test. Though, according to the usual standard test, it is difficult to quantitatively evaluate the bonded part because a resin part which is weaker than the bonded part is fractured firstly, since, according to ISO19095, the resin part can be prevented from the fracture by optimizing the test piece and using auxiliary jig, it is possible to measure the strength of the bonded part.

When the resin material and the metal material are bonded directly according to the conventional bonding methods, since the strength of the interface to be bonded is not sufficient, the metal material would not be elongated in the tensile test of the bonded part. To the contrary, the interface to be bonded in the bonded part 8 has a high strength, the bonded part has a bonding strength as high as the metal material 6 is elongate in the tensile test.

The metal material 6 is not particularly limited as far as the effect of the present invention is not impaired, various known metal materials may be used, and examples include various steels, zinc plated steels, aluminum alloys, magnesium alloys, and the like.

The resin material 4 is not particularly limited as far as the effect of the present invention is not impaired, various known metal materials may be used, and examples include polyamide (PA), polycarbonate (PC), PET (polyethylene terephthalate), various carbon fiber reinforced plastics (CFRP), glass fiber reinforced plastics (GFRP), and the like.

Further, in the metal resin bonded body 2, it is preferable that the metal material 6 is fractured in the tensile test of the bonded part 8. Since the interface to be bonded of the metal resin bonded body 2 has an extremely high strength, depending to the combination of the metal material 6 and the resin material 4, the bonded part 8 has a remarkable bonding strength as high as the metal material 6 is fractured after the elongation.

Further, in the metal resin bonded body 2, it is preferable that the metal material 6 is a steel. When using the s steel as the metal material 6, it is possible to realize to provide a cheap and strong metal resin bonded body 2. According to the metal resin bonded body 2, even when the metal material 6 is the steel, the interface to be bonded has a bonding strength as strong as the steel is elongate in the tensile test, and in a certain case, the bonded part 8 has such a high reliability that the steel is fractured after the elongation.

Though the bonded part 8 where the metal material 6 and the resin material 4 are directly bonded shows a high strength with respect to a shearing stress, the bonded part is relatively easy to be fractured when a stress is applied in the peeling direction. To the contrary, when the bonded part 8 of the metal material 6 and the resin material 4 is made in the form of the Hemming processed part where the resin material 4 is fixed by folding the metal material 6, the stress applied in the peeling direction to the bonded part can be effectively inhibited. As a result, under the practical circumstance of the metal resin bonded body 2, the shearing stress is mainly applied to the bonded part 8, and the metal resin bonded body 2 can be endowed with high reliability.

Here, from the viewpoint that the stress applied to the bonded part 8 is the shearing stress, it is preferable that the metal resin bonded body 2 is a bonded body where in inner surface of a cylindrical metal material 6 and an outer surface of a cylindrical or columnar resin material 4 are bonded. Alternatively, an inner surface of a cylindrical resin material 4 and an outer surface of a cylindrical or columnar metal material 6 may be bonded.

Further, when the bonding step includes the pressurizing step, the interface to be bonded of the metal material 6 and the resin material 4 is extended beyond the heated portion. Though the region to be bonded is within the heated portion in the conventional directly bonded part of the metal material and the resin material, according to the present invention, since the bonding can be achieved over a wide area by the pressurizing process, high bonding strength and reliability can be realized.

In the bonded part 8 of the metal resin bonded body 2, it is preferable that a maximum diameter of the bubbles in the bonded region is less than 0.1 mm. When the maximum diameter of the bubbles is less than 0.1 mm, the bubbles would not almost affect to the joint properties, and thus the metal resin bonded body 2 has extremely good mechanical properties. Further, since the bubbles cannot be confirmed with naked eyes clearly, it is possible to inhibit the drop of image due to existence of defects in the bonded part.

In the above, the typical embodiments of the present invention are explained, but the present invention is not limited to these embodiments, and various changes in design may be possible, those changes may be included within the scope of the present invention.

EXAMPLES

Example 1

An A5052 aluminum alloy plate (80 mm×25 mm×1 mm) as the metal material and a glass fiber reinforced plastic plate (100 mm×25 mm×2 mm) (GFPA T402 available from TOYOBO, matrix resin: PA6, glass fiber: 60% by volume) as the resin material were laminated and bonded by irradiating a laser beam. The laser irradiation was conducted with a semiconductor laser (LDF 4000-40) available from Laserline GmbH in an output power: 850 W, a beam size: 30 mm×3 mm, and a scanning speed: 4 mm/sec.

Figure 3:
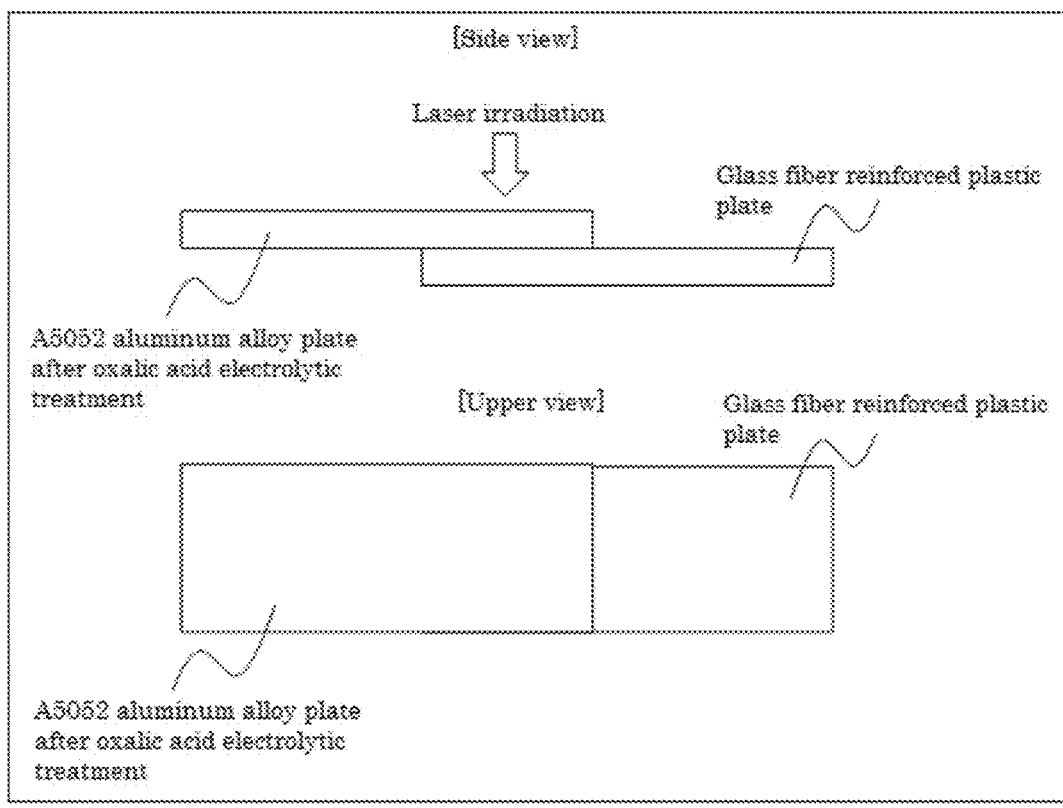
FIG. 3 is a diagrammatic view where the metal material and the resin material are laminated.

As the pre-treatment before the bonding, the A5052 aluminum alloy plate was subjected to the oxalic acid electrolytic treatment (first step) by using an electrolyte of 10% oxalic acid for 1 minute to 10 minutes of the electrolytic treatment. Next, the A5052 aluminum alloy plate treated by the oxalic electrolytic treatment and the glass fiber reinforced plastic plate were laminated in the manner as shown in FIG. 3 to form the interface to be bonded (second step), and, after irradiating the laser from the A5052 aluminum alloy plate to rise the temperature of the interface to be bonded to a glass transition temperature of the resin matrix of the glass fiber reinforced plastic or higher (third step), the interface to be bonded was cooled to a temperature lower than the glass transition temperature under air-cooling (fourth step).

Figure 4:
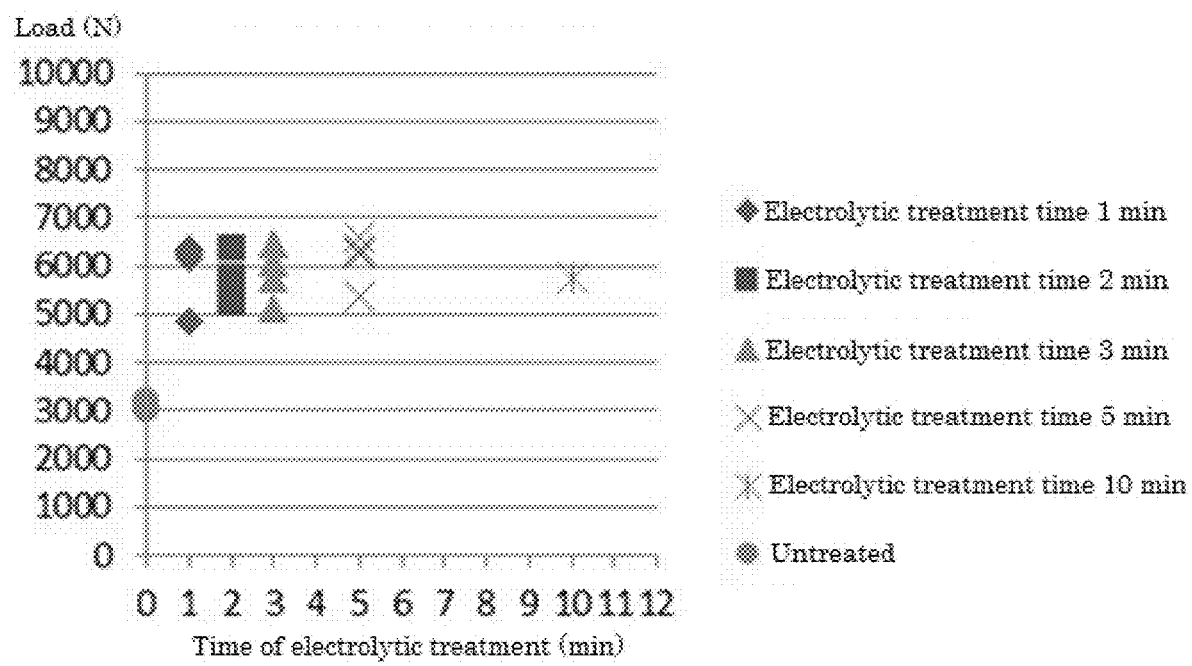
FIG. 4 is a graph which shows a shearing tensile strength of the present metal resin bonded body obtained in Example 1.

FIG. 4 shows the shearing tensile strengths of the present metal resin bonded bodies obtained by varying the time of the electrolytic treatment. As a comparative example, the shearing tensile strength of the comparative metal resin bonded body obtained without the electrolytic treatment was also shown. The shearing tensile test was conducted on the basis of ISO19095.

In comparison with the comparative metal resin bonded body obtained without the electrolytic treatment, the present metal resin bonded bodies have apparently higher strength (about twice of the comparative metal resin bonded body). In addition, with respect to all of the metal resin bonded bodies where the electrolytic treatment was carried out for 1 minute to 5 minutes, the fracture of the A5052 aluminum alloy plates was observed.

Example 2

Figure 5:
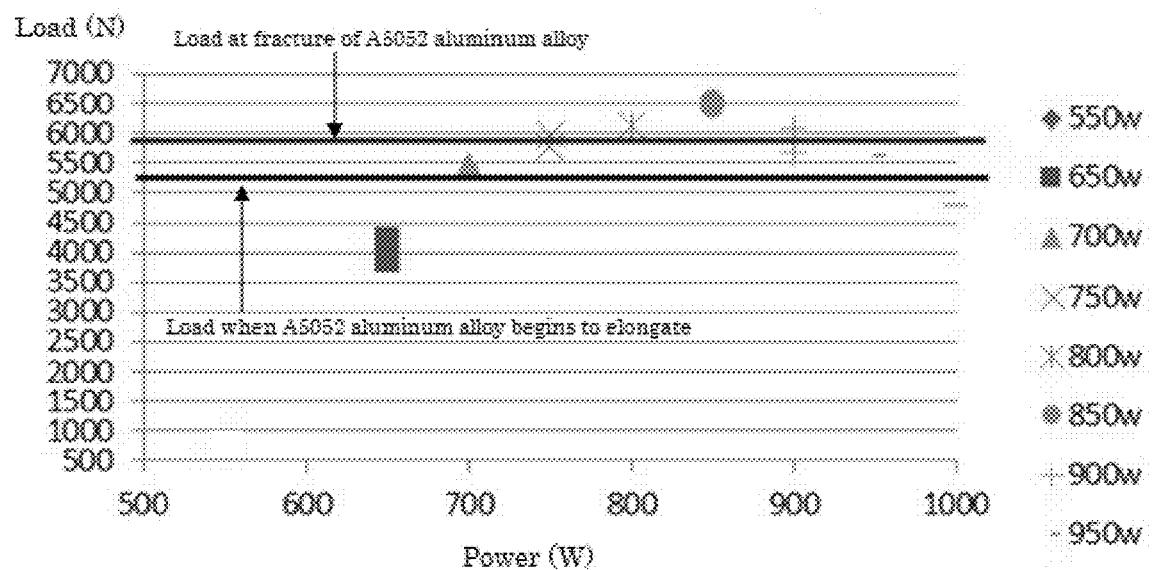
FIG. 5 is a graph which shows a shearing tensile strength of the present metal resin bonded body obtained in Example 2.

The present metal resin bonded bodies produced in the same manner as in Example 1 were obtained excepting that the electrolytic treatment time was 2 minutes and the laser output power was varied within the range of 650 W to 1000 W. The shearing tensile strengths evaluated in the same manner as in Example 1 are shown in FIG. 5.

The strong bonded parts were formed in every present metal resin bonded bodies, but the shearing tensile strength was varied depending to the output power of the laser beam, and when the output power of laser was within 700 W to 900 W, the extremely high shearing tensile strength was obtained. It is assumed that the shearing tensile strengths were lowered due to the peeling of the resin from the interface to be bonded and due to the lowering of the strength of the resin, because the heating was poor when at 650 W, and the heating was excess when at 1000 W.

Example 3

Figure 6:
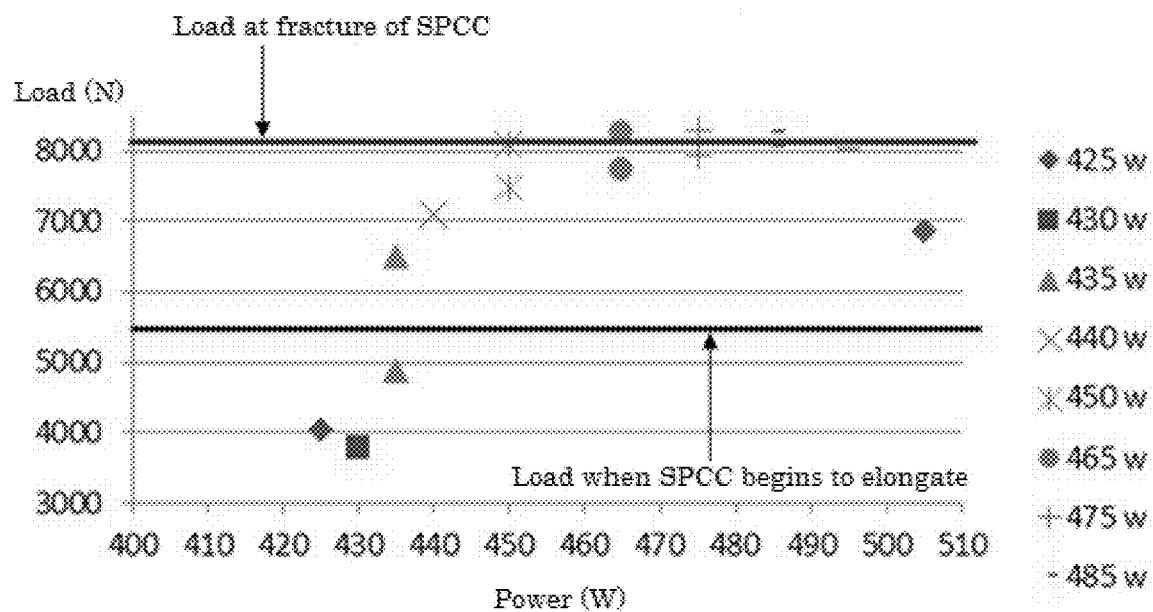
FIG. 6 is a graph which shows a shearing tensile strength of the present metal resin bonded body obtained in Example 3.

The present metal resin bonded bodies produced in the same manner as in Example 1 were obtained excepting that an SPCC steel plate (80 mm×25 mm×1 mm) was used as the metal material and a carbon fiber reinforced plastic plate (100 mm×25 mm×2 mm) (TORAYCA TLP1040 available from TORAY, matrix resin: PA6, reinforcing fiber: carbon fiber) was used as the resin material, the electrolytic treatment was carried out for 2 minutes, and the output power of the laser beam was 425 W to 505 W. The shearing tensile strengths evaluated in the same manner as in Example 1 are shown in FIG. 6.

The shearing tensile strength was varied depending to the output power of the laser beam, but in case that the SPCC steel plate was used as the metal material, it has been found that the bonded bodies having the bonded strength as high as that the SPCC steel plate was fractured or elongated were obtained.

Figure 7:
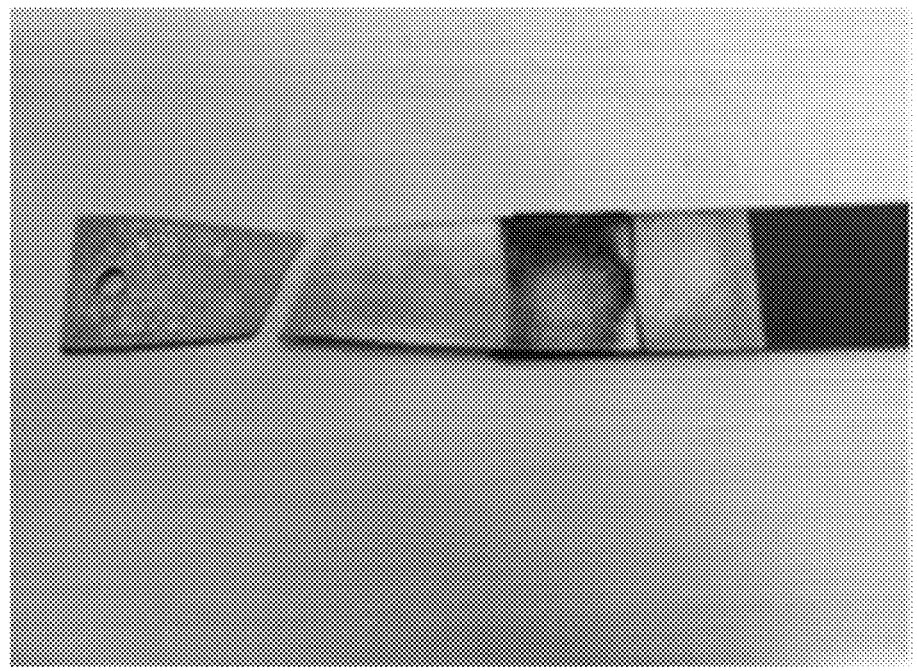
FIG. 7 is a photograph showing an appearance of the test piece of the present metal resin bonded body obtained in Example 3 after the shearing test.

FIG. 7 is a photograph showing an appearance of typical test piece after the shearing tensile test with respect to the present metal resin bonded body. It can be confirmed that the SPCC steel plate was elongated to be fractured. On the other hand, the bonded part was still good.

Example 4

Figure 8:
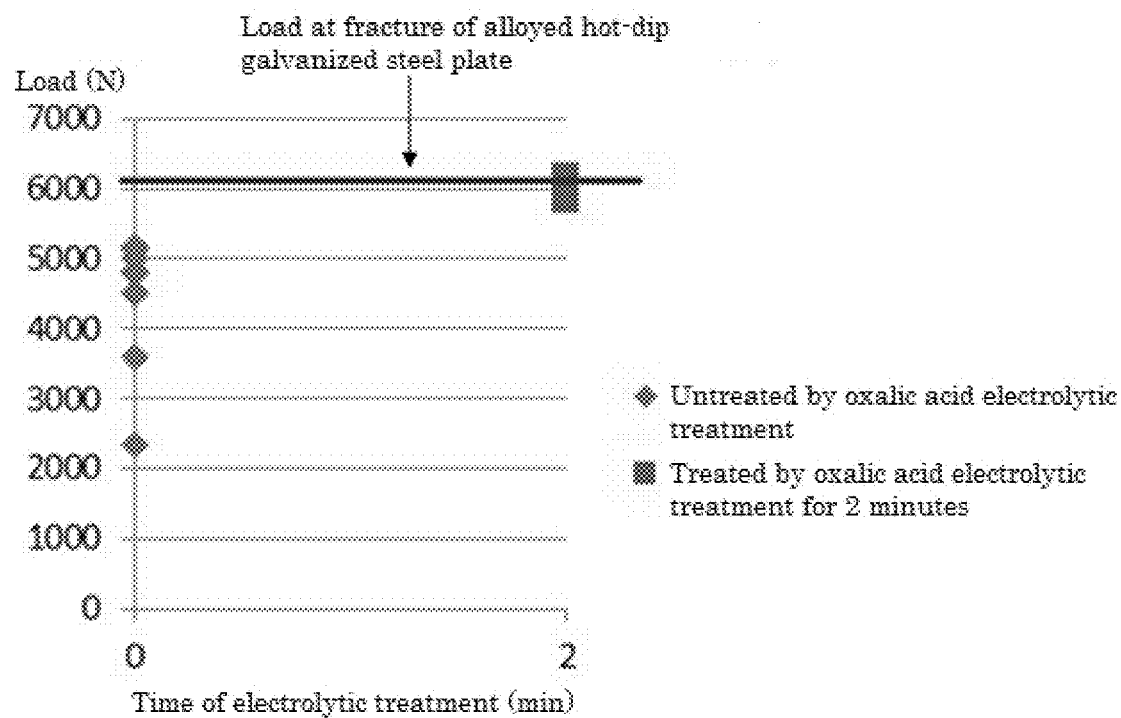
FIG. 8 is a graph which shows a shearing tensile strength of the present metal resin bonded body obtained in Example 4.

The present metal resin bonded body produced in the same manner as in Example 1 was obtained excepting that an alloyed hot-dip galvanized steel plate (GA, 80 mm×25 mm×0.8 mm) was used as the metal material, the electrolytic treatment was carried out for 2 minutes, and the output power of the laser beam was 350 W. The shearing tensile strengths evaluated in the same manner as in Example 1 are shown in FIG. 8. As a comparative example, the shearing tensile strength of the comparative metal resin bonded body obtained without the electrolytic treatment is also shown.

The shearing tensile strengths are apparently different whether or not the bonded body was subjected to the electrolytic treatment, and it is clear that the present metal resin bonded body which was subjected to the electrolytic treatment has a higher shearing strength.

Figure 9:
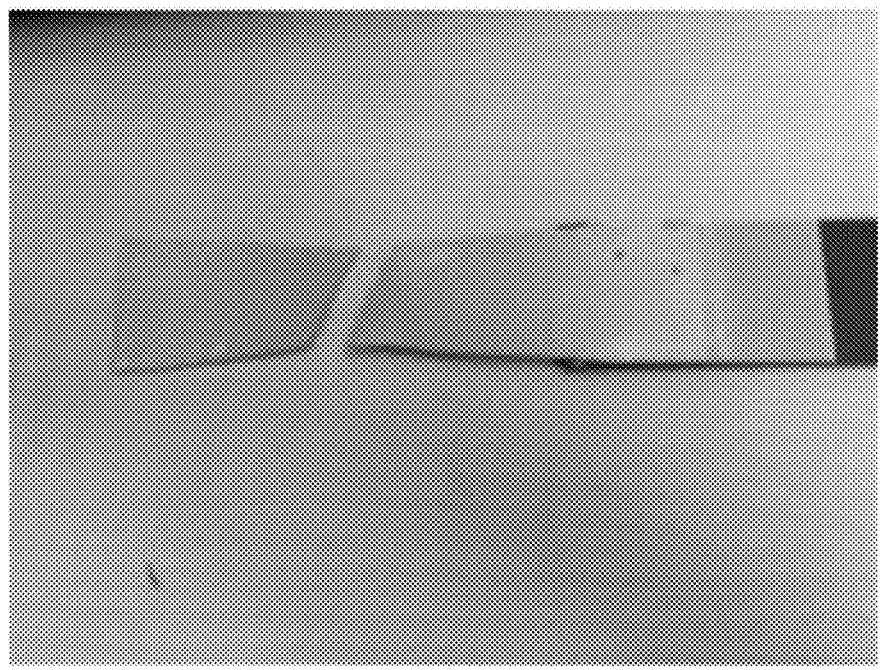
FIG. 9 is a photograph showing an appearance of the test piece of the present metal resin bonded body obtained in Example 4 after the shearing test.

FIG. 9 is a photograph showing an appearance of typical test piece after the shearing tensile test with respect to the present metal resin bonded body. It can be confirmed that the alloyed hot-dip galvanized steel plate was elongated to be fractured. On the other hand, the bonded part was still good.

Example 5

Figure 10:
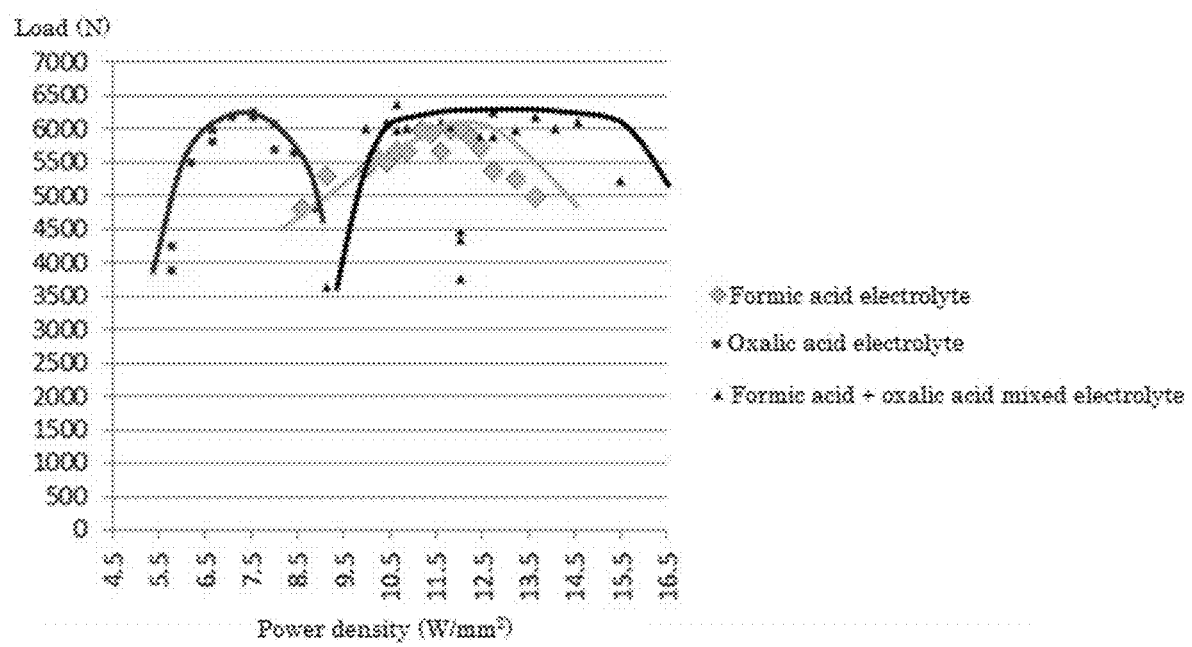
FIG. 10 is a graph which shows shearing tensile strengths of the present metal resin bonded bodies obtained in Example 5 and 6.

The present metal resin bonded bodies produced in the same manner as in Example 1 were obtained excepting that an electrolytic solution prepared by mixing 10 g of oxalic acid and 10 g of formic acid to 180 g of distilled water was used, and the laser beam was irradiated at various power densities (W/mm$^2$). An area used for the laser beam was 26 mm×3 mm. The shearing tensile strengths evaluated in the same manner as in Example 1 are shown in FIG. 10. As a comparative example, the shearing tensile strength obtained in Example 1 is also shown in FIG. 10 as the abscissa being the power density.

Example 6

The present metal resin bonded bodies produced in the same manner as in Example 5 were obtained excepting that an electrolytic solution prepared by using a 10% solution of formic acid was used. The shearing tensile strengths evaluated in the same manner as in Example 1 are shown in FIG. 10.

In FIG. 10, regardless of the kind of used electrolyte, there is the most suitable bonding condition where the metal resin bonded body having an extremely high shearing tensile strength of around 6000 N. On the other hand, the range of the bonding condition varies depending to the electrolyte, and it is found that, when the mixed solution of oxalic acid and formic acid was used as the electrolyte, the high shearing tensile strength can be obtained in the wider range of the bonding condition.

In addition, when comparing the case where the oxalic acid electrolyte was used with the case where the formic acid electrolyte was used, it is found that, in case where oxalic acid electrolyte was used, the high shearing tensile strength was obtained at the lower power density. The reason is assumed that, in case where the oxalic acid electrolyte was used, the surface to be electrolytic-treated indicated pale red to increase the absorption efficiency of the laser beam. This result shows that, when making the power density of the laser beam low, the use of the oxalic acid electrolyte is preferable.

Figure 11:
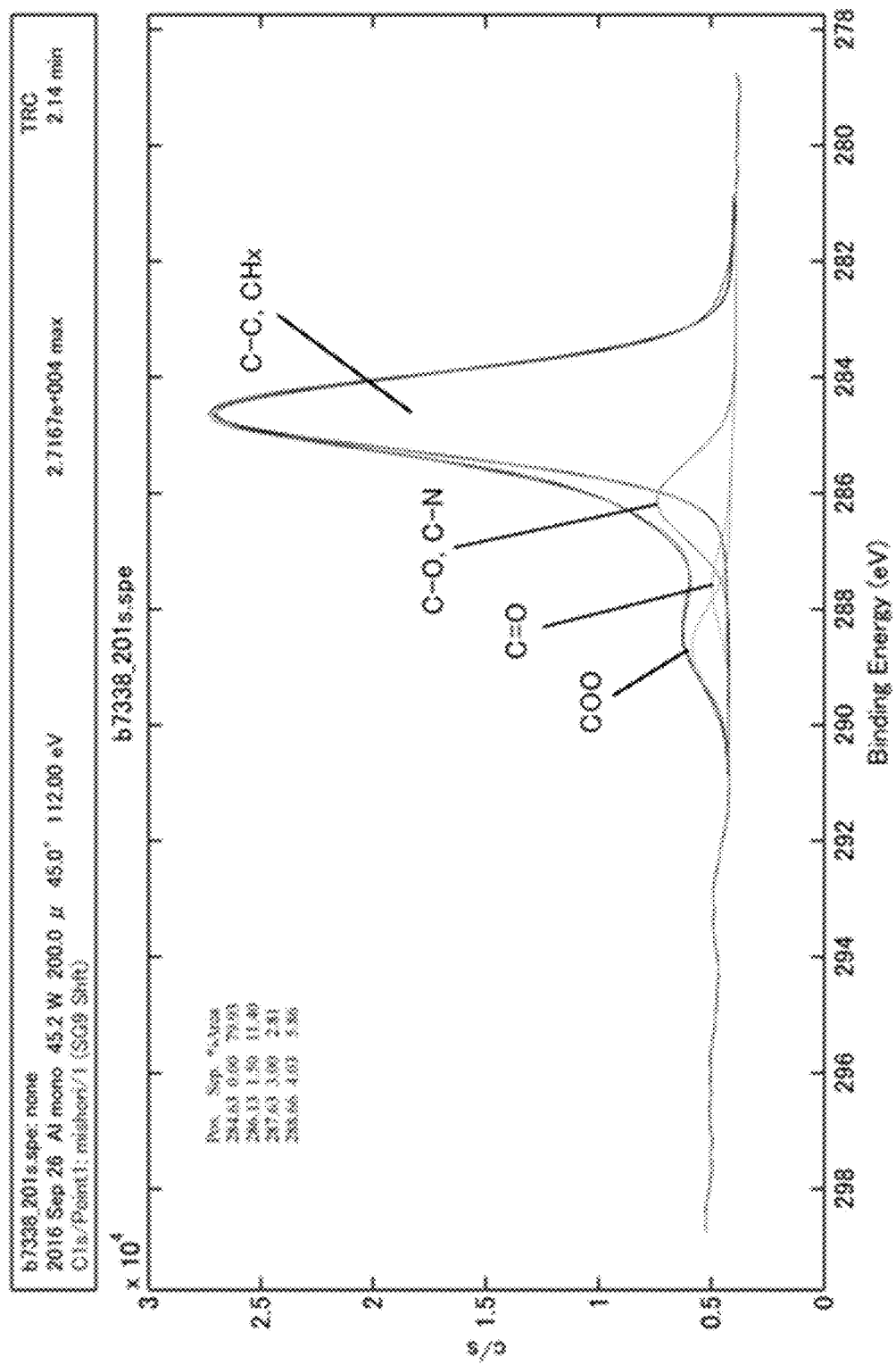
FIG. 11 is an XPS spectrum of the surface of the A1050 aluminum plate which is subject to the electrolytic treatment.

In order to observe the influence of the electrolytic treatment by using the oxalic acid electrolyte to the surface of the metal material, an XPS spectrum of the surface of the A1050 aluminum plate which was subjected to the electrolytic treatment by using the electrolyte having an oxalic acid concentration of 10% for 2 minutes is shown in FIG. 11. As a comparative example, the result of the surface of the A1050 aluminum plate which was not subjected to the electrolytic treatment is also shown. For the measurement, Quantera SXM available from PHI corporation was employed, and the conditions were an excited X ray: monochromatic Al $K_{1,2}$ ray (1486.6 eV), a diameter of X ray of 200 μm, and an escape angle of photon: 45° (gradient of a detector relative to the surface of the sample).

When subjecting to the electrolytic treatment, in comparison with untreated case, the increase of the COO bond and CO=bond is significantly observed. The result proves that the surface of the A1050 aluminum plate is coated (protected) with oxalic acid.

EXPLANATION OF SYMBOLS

2 Metal resin bonded body
4 Resin material
6 Metal material
8 Bonded part

The invention claimed is:

1. A bonding method of a metal material and a resin material wherein the metal material and the resin material are bonded directly, comprising:
   electrolytically treating the metal material by contacting the metal material with a carboxylic acid having reducibility for 1 to 5 minutes, so as to remove an outer layer of the metal material and expose an underlying new surface on the metal material, and coating the new surface with the carboxylic acid to obtain a carboxylic acid-coated metal material;
   laminating the resin material and the carboxylic acid-coated metal material to form an interface to be bonded, the resin material being a resin material capable of generating a carboxyl group upon thermal decomposition;
   heating the interface to be bonded to a temperature sufficient to cause thermal decomposition of the resin material, so as to remove water from the interface to be bonded and to generate the carboxyl group from the resin material, and at the same time, to remove the carboxylic acid coating the new surface of the carboxylic acid-coated metal material to expose the new surface; and
   cooling the interface to be bonded to a temperature lower than a glass transition temperature of the resin material to form a bonded part wherein the carboxyl group is bonded directly to the new surface,
   wherein a maximum diameter of bubbles in the bonded part is less than 0.1 mm.

2. The bonding method of metal material and resin material according to claim 1, wherein the carboxylic acid is at least one selected from the group consisting of oxalic acid and formic acid.

3. The bonding method of metal material and resin material according to claim 1, wherein the interface to be bonded is heated by laser irradiation.

4. The bonding method of metal material and resin material according to claim 3, wherein the laser is irradiated from the metal material side.

5. The bonding method of metal material and resin material according to claim 1, wherein the bonding method further comprises, immediately after the cooling step, pressing the bonded part.

6. A metal resin bonded body formed by the bonding method according to claim 1, the metal resin bonded body comprising a laminated bonded body of the metal material and the resin material, wherein
   the resin material and the metal material are bonded directly, and
   the metal material is elongated in a tensile test of the bonded part.

7. The metal resin bonded body according to claim 6, wherein the metal material is fractured in the tensile test.

8. The metal resin bonded body according to claim 6, wherein the metal material is a steel.

9. The metal resin bonded body according to claim 6, wherein the resin material has a Hemming processed part where the metal material is folded and fixed, and the resin material and the metal material are bonded directly at the Hemming processed part.

10. The bonding method of metal material and resin material according to claim 2, wherein the interface to be bonded is heated by laser irradiation.

11. The bonding method of metal material and resin material according to claim 10, wherein the laser is irradiated from the metal material side.

12. The bonding method of metal material and resin material according to claim 2, wherein the bonding method further comprises, immediately after the cooling step, pressing the bonded part.

13. The bonding method of metal material and resin material according to claim 3, wherein the bonding method further comprises, immediately after the cooling step, pressing the bonded part.

14. The bonding method of metal material and resin material according to claim 4, wherein the bonding method further comprises, immediately after the cooling step, pressing the bonded part.

15. The bonding method of metal material and resin material according to claim 10, wherein the bonding method further comprises, immediately after the cooling step, pressing the bonded part.

16. The bonding method of metal material and resin material according to claim 11, wherein the bonding method further comprises, immediately after the cooling step, pressing the bonded part.

17. The metal resin bonded body according to claim 7, wherein the metal material is a steel.

18. The metal resin bonded body according to claim 7, wherein the resin material has a Hemming processed part where the metal material is folded and fixed, and the resin material and the metal material are bonded directly at the Hemming processed part.

19. The metal resin bonded body according to claim 8, wherein the resin material has a Hemming processed part where the metal material is folded and fixed, and the resin material and the metal material are bonded directly at the Hemming processed part.

20. The metal resin bonded body according to claim 17, wherein the resin material has a Hemming processed part where the metal material is folded and fixed, and the resin material and the metal material are bonded directly at the Hemming processed part.

21. The bonding method of metal material and resin material according to claim 1, wherein the metal material is steel.

22. The bonding method of metal material and resin material according to claim 1, wherein the resin material is one selected from the group consisting of polyamide resin, polycarbonate resin, polyethylene terephthalate, carbon fiber-reinforced plastic, and glass fiber-reinforced plastic.

* * * * *